(12) United States Patent
Hartley

(10) Patent No.: US 8,707,035 B2
(45) Date of Patent: Apr. 22, 2014

(54) HIGH PRIVACY OF FILE SYNCHRONIZATION WITH SHARING FUNCTIONALITY

(75) Inventor: David John Hartley, Bellevue, WA (US)

(73) Assignees: Decho Corporation, Seattle, WA (US); VMware, Inc., Palo Alto, CA (US)

( * ) Notice: Subject to any disclaimer, the term of this patent is extended or adjusted under 35 U.S.C. 154(b) by 85 days.

(21) Appl. No.: 13/435,233

(22) Filed: Mar. 30, 2012

(65) Prior Publication Data
US 2013/0262862 A1    Oct. 3, 2013

(51) Int. Cl.
*H04L 29/06* (2006.01)
*H04L 9/32* (2006.01)
*G06F 11/30* (2006.01)
*G06F 12/14* (2006.01)

(52) U.S. Cl.
USPC .............. 713/165; 713/175; 713/189; 726/24

(58) Field of Classification Search
None
See application file for complete search history.

(56) References Cited

U.S. PATENT DOCUMENTS

| 8,001,603 | B1* | 8/2011 | Kennedy | 726/24 |
| 2009/0327299 | A1* | 12/2009 | Schwartz et al. | 707/10 |
| 2010/0185852 | A1* | 7/2010 | Ogawa et al. | 713/165 |
| 2012/0036370 | A1* | 2/2012 | Lim et al. | 713/189 |
| 2013/0198521 | A1* | 8/2013 | Wu | 713/175 |

* cited by examiner

*Primary Examiner* — Shin-Hon Chen

(57) ABSTRACT

Systems and methods for providing privacy of file synchronization with sharing functionality are presented. In embodiments, a file synchronization system comprises one or more folders associated with one or more non-shared encryption keys, which may be a managed key shared across an organization, and/or a personal key that is not shared or has limited third-party sharing. The one or more non-shared encryption keys are not known to the data storage service. The file synchronization system may also contain one or more folders associated with a shared encryption key that is shared with the data storage service, and in embodiments, with a set of users of the service. The system may include a mapping correlating folders to encryption type so items in each folder can be handled appropriately. The system may have additional folders, such as one or more public folders that may be available with limited or no restrictions.

20 Claims, 12 Drawing Sheets

HIGH PRIVACY OF FILE SYNCHRONIZATION WITH SHARING FUNCTIONALITY

BACKGROUND

A. Technical Field

The present invention pertains generally to computer applications and data storage, and relates more particularly to systems and methods for facilitating secure data storage and data sharing.

B. Background of the Invention

Over that last several years, digital technologies have increasingly become more prevalent in people's work and personal lives. Smaller, less expensive, and more powerful computing devices, along with the expansion in both reach and speed of data networks, have helped fuel this digital growth. Currently, almost every organization employs computers. And similarly, most families have at least one computer. If one counts items such as multi-media players, cameras, smartphones, and the like, companies and personal users use many digital devices.

The expansion in digital devices has created a complementary expansion in digital data demands. For users, be they business, governmental, non-profit, or personal, having secure data storage and secure access are important, if not critical, matters. One attempt to address these issues is cloud file synchronization.

Cloud file synchronization allows users to copy files to a remote storage network via an Internet connection. These services typically allow users to move files across all their devices via device synchronization clients that continually keep the devices up to date with a file snapshot in the public cloud.

Both consumer users and business system administrators have concerns around public cloud security and privacy. In the case of consumer users, these concerns may be mitigated by offering support for personal encryption keys. A personal encryption key is a key that is known only to the user and his/her file synchronization clients. This renders their data in the cloud highly private, depending on the strength of the encryption. In the case of businesses, these concerns are similarly mitigated by means of a managed encryption key, which is owned by and private to the file synchronization administrator and common across the company or organization. The employees' synchronization clients have access to this managed key while the employees do not, so that the business can have confidence that their cloud data is private.

End users of file synchronization systems may also have an expectation that collaborative sharing be supported by the system. Collaboration is a very useful and popular functionality across both consumer and business users. Typically, a shared cloud folder is duplicated to the share members' devices by the file synchronizer, allowing collaborative sharing of the cloud folder, with each user being able to add and modify files on their devices. If the user modifies a file while offline, when the user reconnects the files are then synchronized.

This form of sharing is incompatible with the requirements for public cloud privacy just mentioned. Consider a consumer case, which is depicted in FIG. 1 and FIG. 2. FIG. 1 illustrates that a personal-encryption-key user (consumer user 1) can share, whether collaboratively or simple read-only, from their file synchronization folder by giving their personal encryption key to the share invitee (consumer user 2). However, such an approach is unwieldy because the user (e.g., consumer user 1) loses control over their key. If the invitee (e.g., consumer user 2) does not take adequate care to secure the key, it becomes exposed. However, as illustrated in FIG. 2, a personal-encryption-key user (consumer user 3) cannot share from their file synchronization folder without giving their personal encryption key to the share invitees. If the personal-encryption-key user (consumer user 3) does not share the key, the invitee (consumer user 2) cannot decrypt the data, making the folder or files unreadable.

Consider also the business case in which a managed key is employed. For businesses, collaborative sharing with external partners is an important capability of a cloud file synchronization system, but it has not been feasible because it cannot be securely managed. In the business case depicted in FIG. 3, employees can share with fellow employees (e.g., Org. A User 1 can share with Org. A User 2) because the system administrator has configured each of their client systems to have access to the managed key used to encrypted/decrypt the data. However, as illustrated in FIG. 4, company users (e.g., Org A User 1) cannot share with anybody external to the company (e.g., Org. B User 2) because individuals outside of the organization do not have access to the managed encryption key.

Accordingly, what is needed are improved systems and methods for providing secure data storage and secure data sharing or collaboration.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
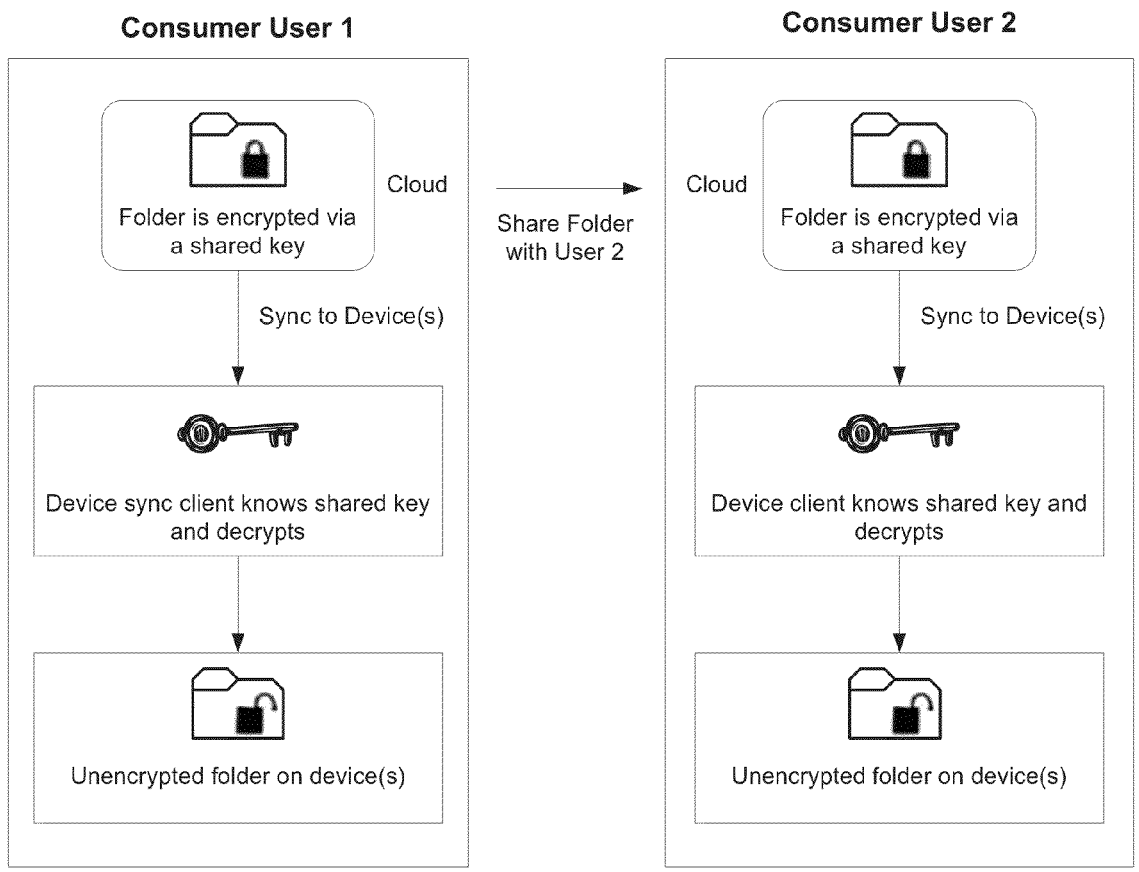
FIG. 1 graphically depicts a method of sharing files between users using a shared key.
Figure 2:
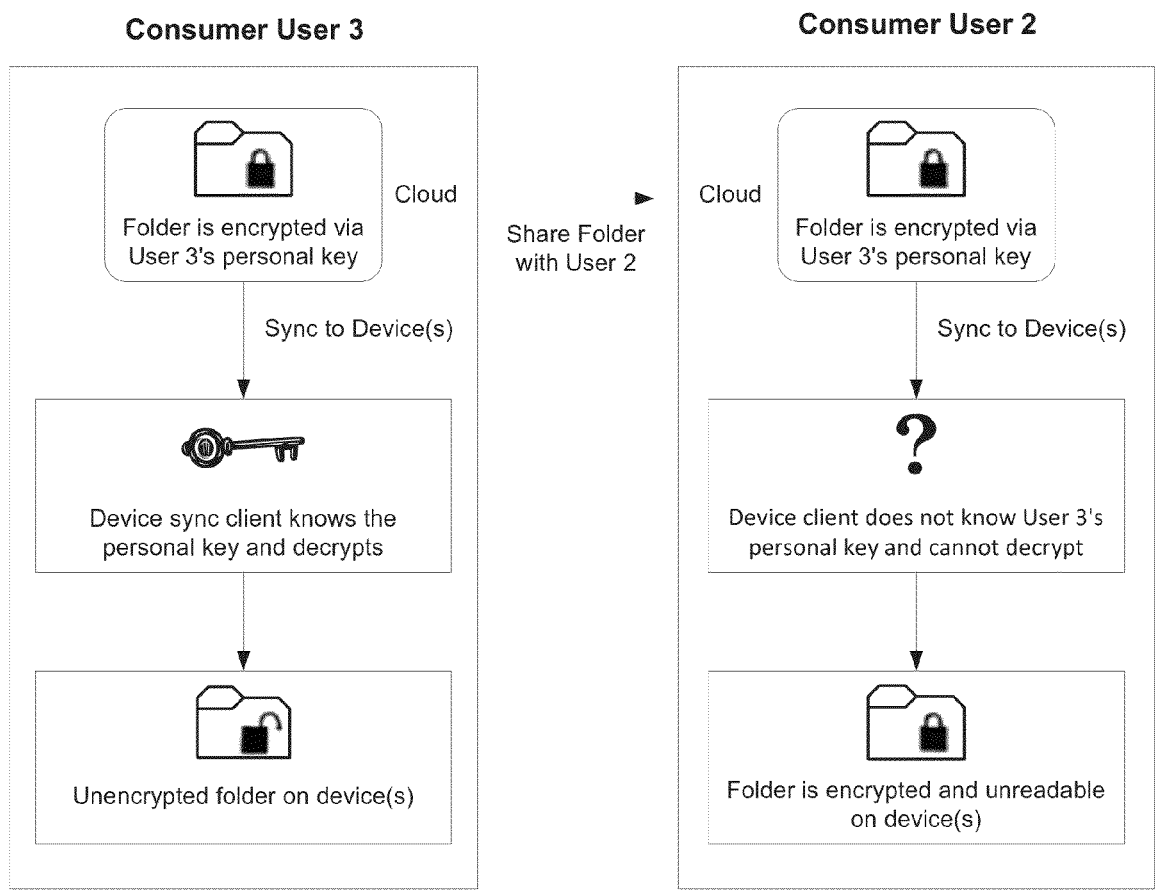
FIG. 2 graphically depicts the problem of trying to share files between users using a personal key.
Figure 3:
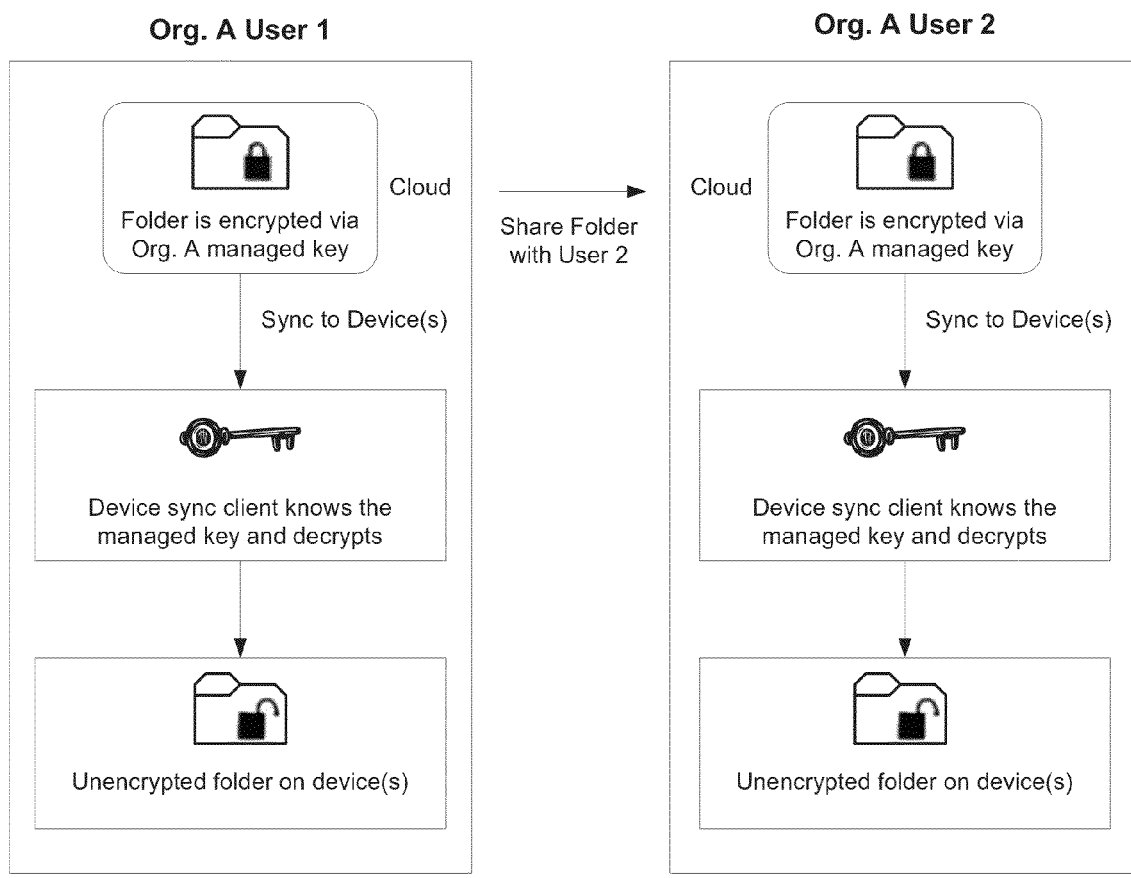
FIG. 3 graphically depicts a method of sharing files between users using a managed key.
Figure 4:
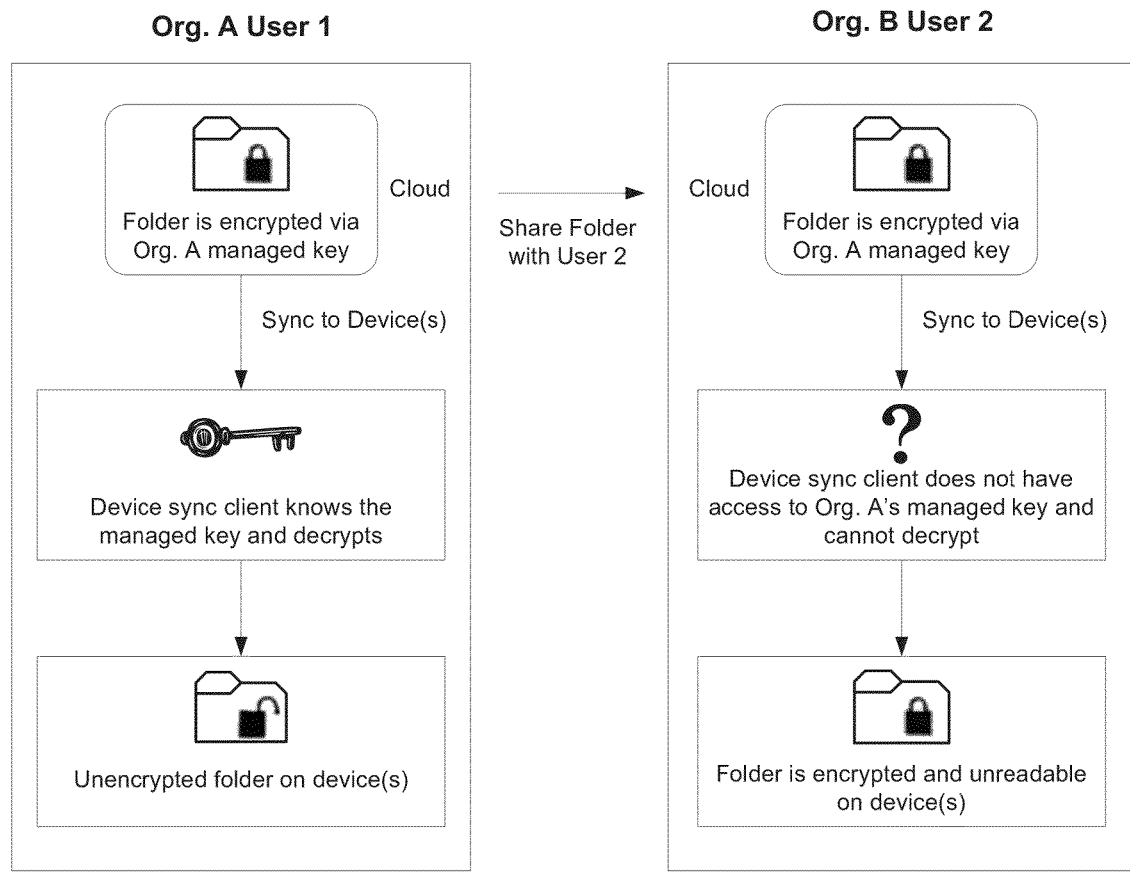
FIG. 4 graphically depicts the problem of trying to share files between users that do not have access to the same managed key.

In the following description, for purposes of explanation, specific details are set forth in order to provide an understanding of the invention. It will be apparent, however, to one skilled in the art that the invention may be practiced without these details. Furthermore, one skilled in the art will recognize that embodiments of the present invention, described below, may be implemented in a variety of ways, such as a process, an apparatus, a system, a device, or a method on a tangible computer-readable medium.

Also, it shall be noted that steps or operations may be performed in different orders or concurrently, as will be apparent to one of skill in the art. And, in instances, well known process operations have not been described in detail to avoid unnecessarily obscuring the present invention.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules. Components or modules may be implemented in software, hardware, or a combination thereof.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" or "function" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

Embodiments of the present invention presented herein will be described using web or cloud application examples. These examples are provided by way of illustration and not by way of limitation. One skilled in the art shall also recognize the general applicability of the present inventions to other applications.

A. Overview

Due to the ineffectual results of prior methods for storing and sharing data, systems and methods are needed that can securely store data but also provide secure sharing capabilities. Aspects of the present invention overcome these problems by providing solutions not seen previously. In embodiments, a file synchronization system contains one or more folders associated with one or more non-shared encryption keys, which may be a managed key shared across an organization, a personal key that is not shared with others or has limited third-party sharing, or both. The one or more non-shared encryption keys are not shared with the data storage service. In embodiments, the file synchronization system also contains one or more folders associated with a shared encryption key, wherein "shared" means shared across a set of users of the data storage product or service, including, in embodiments, with the data storage service. In embodiments, the system includes a mapping of folders to encryption type so that the items in each folder may be handled appropriately. Thus, in embodiments, anything the user places in the managed-key folder is secure from the public and the data storage service, but may be shared with those individuals that have access to the managed key, such as co-workers. Anything the user places in the shared folder may be shared to other users of the product or service upon authorization of the user. Thus, users can keep most of their data private by only moving files they wish to share into this sharing subfolder, and it is very clear to them what data is less private. They can immediately reduce their sharing exposure/increase their privacy by deleting the contents of the sharing subfolder. In embodiments, business administrators can easily impose improved security by disabling the sharing subfolder of users, and, in embodiments, they may also easily audit files that their employees have shared. In embodiments, the service may have additional folders, such as a private key/personal key folder that is accessible by only the user, and/or a public folder that may be available to anyone with limited or no restriction.

Figure 5:
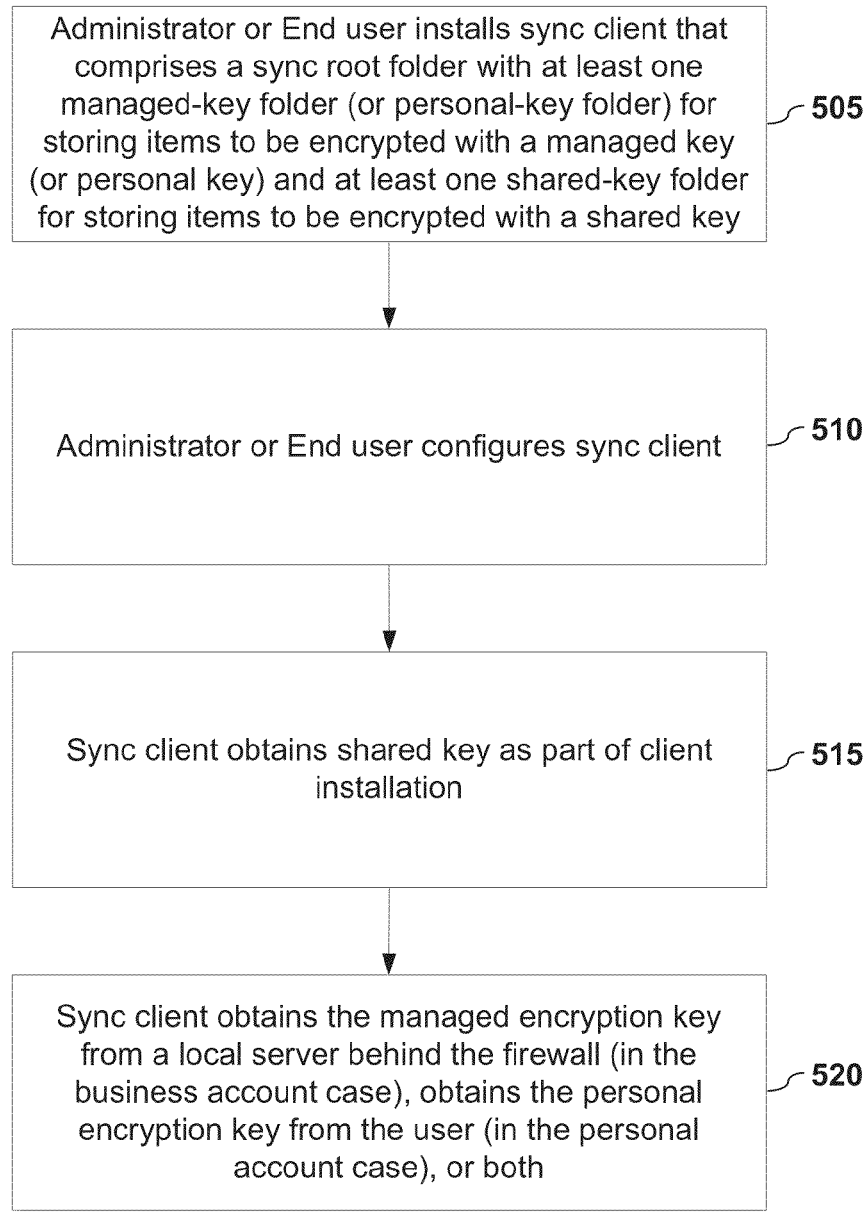
FIG. 5 depicts a method for employing a high privacy of file synchronization with sharing functionality according to embodiments of the present invention.

FIG. 5 depicts a method for employing a high privacy of file synchronization with sharing functionality according to embodiments of the present invention. In embodiments, a system administrator, in the case of an organizational account, or an end user, in the case of a consumer account, installs (505) a sync client. The system administrator or the end user configures (510) the synchronized (or sync) root folder and the per-folder encryption settings.

In embodiments, the sync root folder includes at least one shared-key folder for storing items (folders, files of any type, etc.) to be synchronized with the remote datastore and which are encrypted with a shared key. In embodiments, both the client system and the remote datastore manager have access to the shared key, which may be a global key for the sync service. In embodiments, the global key may be included (515) as part of the client installation code.

In embodiments, the sync root folder comprises at least one managed-key folder for storing items (folders, files of any type, etc.) to be synchronized with a remote datastore and which are encrypted with a managed key. In embodiments, access to the managed key is limited to within the client system or organization. Thus, the remote datastore manager that provides the sync service does not have access to the managed key. In embodiment, for an organization, the managed key is obtained or otherwise accessed (520) from a local server behind a firewall. In embodiment, for a consumer user, the managed key may be a personal key, to which only the end user has access, or the end user and select third-parties have access. In alternative embodiments, the sync root folder may contain one or more managed-key folders, one or more personal key folders, or both.

In embodiments, the sync root folder may also include a public folder in which data has no encryption. Such data, when stored in the public storage may be viewable to anyone able to access the file. In embodiments, the file may be unencrypted but access may be limited to user of the sync service. Alternatively or additionally, the file may be unencrypted but access may be limited by being located at a public but obfuscated location. Thus, to view the file, an individual must know the obfuscated uniform resource identifier (URI) of the item.

As indicated above, the user or system administrator may configure the sync client. In addition to setting or identifying encryption keys, the sync client may have one or more additional configurations settings. Examples of configuration settings include, but are not limited to, setting the location of the sync root folder within the client system, naming of one or more of the folders, setting the frequency of syncing, setting with whom items may be shared, setting sharing privileges, and other user preferences. In embodiments, the type of encryption algorithm used may also be selected or identified.

In embodiments, the configuration process may also include setting or adopting policies. For example, in embodiments, an organization may set policies related to security such as (by way of example and not limitation) automatically disabling the shared folder, restricting which files may be placed within a shared folder, restricting with whom folders may be shared, and so forth. Furthermore, in embodiments, an organization or user may set default policies with the datastore manager system and have these policies automatically applied when a new client is installed. One skilled in the art shall recognize that a number of additional configurations may be included.

B. System Embodiments

Figure 6:
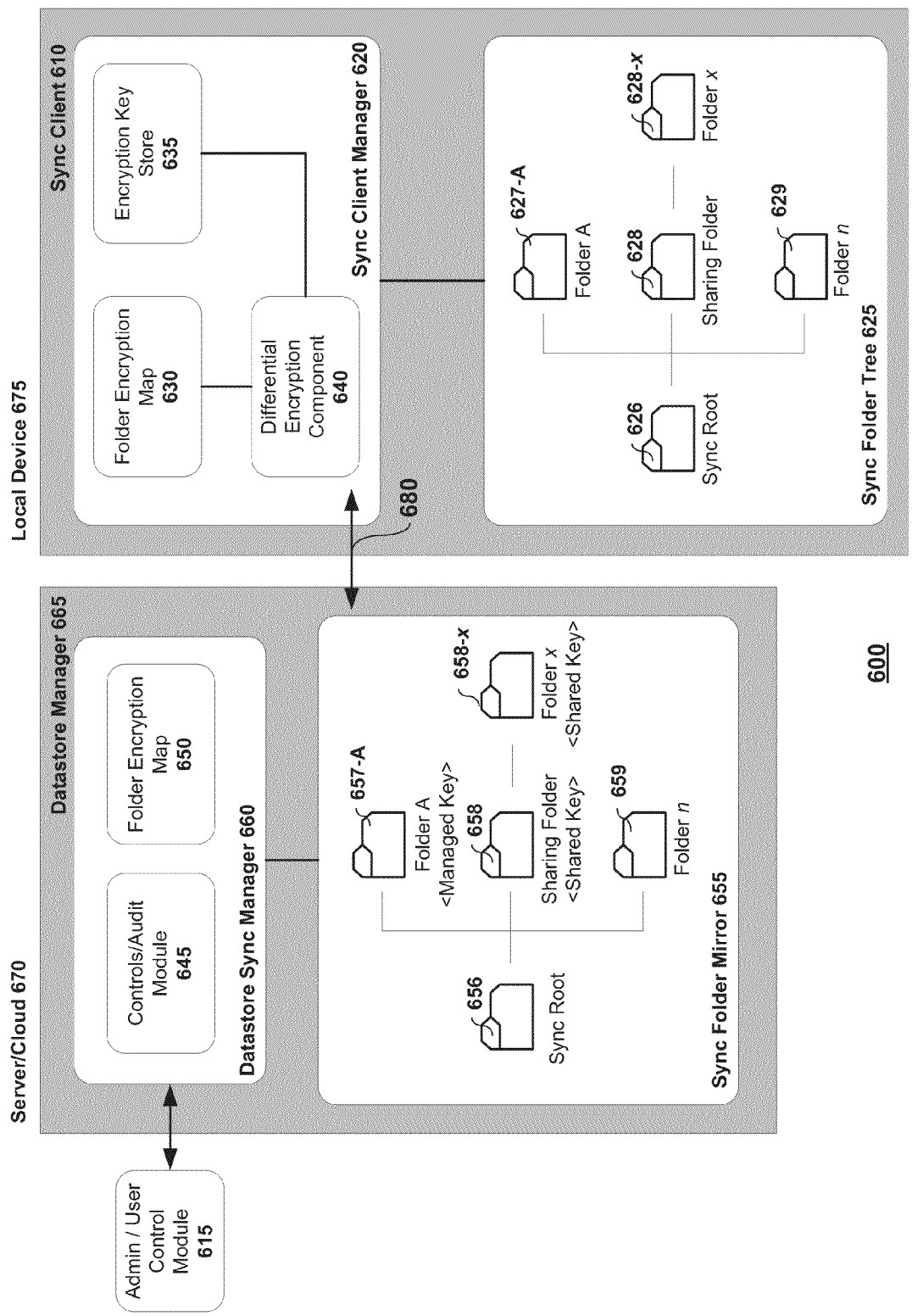
FIG. 6 graphically depicts a synchronization system according to embodiments of the present invention.

FIG. 6 graphically depicts a synchronization system 600 according to embodiments of the present invention. As shown in FIG. 6, the synchronization system 600 comprises a datastore manager system 665, which may operate on a set of one or more cloud-based servers 670, and a sync client 610, which may operate on a local computing device 675.

1. Sync Client Embodiments

In embodiments, the sync client 610 comprises a sync folder tree 625 and a sync client manager 620.

The sync folder tree 625 comprises folders for storing items, such as files of any type and other folders. In embodiments, all items stored within the sync folder 625 are synchronized or otherwise duplicated in a mirrored folder tree 655 in a remote datastore 670.

In embodiments, the sync folder tree 625 comprises folders that are designed to have different encryption applied to them. For example, as shown in FIG. 6, the sync folder tree 625 includes at least one shared-key folder (e.g., folders 628 and 628-x) for storing items that are encrypted with a shared key when uploaded and stored in the sync folder mirror 655, and at least one managed-key folder (e.g., folder 627-A) for storing items that are encrypted with a managed key when uploaded and stored in the sync folder minor 655.

It should be noted that the sync folder tree 625 may include additional folders. For example, in embodiments, the sync folder tree 625 may include one or more folders that have no encryption key, or one or more folders that are encrypted with a different key or keys. The different key may be another managed key (different from the managed key for Folder A 627-A), a different shared key (different from the shared key of the sharing folder 628), a personal key, or a combination thereof. For example, Folder n may be a folder that is encrypted with a personal key when data is communicated to and stored in the remote datastore 655.

It shall be noted that, in embodiments, the files in the sync folder tree 625 may be stored in an unencrypted state. Alternatively, the files in the sync folder tree 625 may be stored in encrypted states according the folder's encryption and are unencrypted by the sync client manager 620 when accessed by a user operating the local device 675.

In embodiments, management of which folders is encrypted/decrypted using which key or keys (which shall be understood to include no key at all, in the case of some folders that have no encryption applied to them), is coordinated by the sync client manager 620. In the embodiment depicted in FIG. 6, the sync client manager 620 includes a folder encryption map 630 and a differential encryption component 640. The differential encryption component 640 may be configured to monitor changes to items in the sync folder tree 625 or to receive changes to items in the sync folder minor 655 by being communicatively coupled via one or more connections 680 to the remote datastore 670. In embodiments, the differential encryption component 640 monitors for changes to items within the sync root 626 by registering with the local client's operating system to be notified when changes occur to any item within the sync folder tree 625, although one skilled in the art shall recognize other ways to monitor for changes to items in file system, none of which is critical to the present invention. In embodiments, the differential encryption component 640 identifies what has been changed, applies the appropriate encryption based upon which folder the file is in, and transmits the data to the remote datastore 670 via the network link 680. In embodiments, the transmitted data may represent one or more files, one or more folders, one or more differential portions that have changed, or combinations thereof.

In embodiments, to determine the encryption that should be applied to the data, the differential encryption component 640 interfaces with a folder encryption map 630. The folder encryption map 630 comprises a correlation or mapping between file paths/folders in the sync folder tree 625 and their associated encryption/decryption keys. It should be noted that, in embodiments, a folder may have no encryption associated with it, which means that it receives no encryption. In embodiments, the folder encryption map 630 may include other information related to encryption such as an encryption algorithm identifier (e.g., Advanced Encryption Standard (AES), Triple-DES encryption, etc.), the number of bits of encryption (e.g., 128, 256, etc.), and the like.

In embodiments, the folder encryption map 630 may identify the appropriate encryption for the folders and a pathway to obtain the key for the folders. The differential encryption component 640 uses the identified key and pathway to access the key to handle (encrypt/decrypt) the data. Additionally, or alternatively, in embodiments, the sync client manager 620 may optionally include an encryption key store 635 that is a local key store. In embodiments, the differential encryption component 640 interfaces with the folder encryption map 630 to obtain the correct encryption information and interfaces with the encryption key store 635 to obtain the appropriate key. One skilled in the art shall recognize that the folder encryption map 630 and the encryption key store 635 may be integrated into a single component. In embodiments, the information in the folder encryption map 630, the encryption key store 635, or both are securely stored to prevent access by nefarious entities. Whether stored in the encryption key store 635 or whether a path location is provided to access keys, it shall be note that the client system 610 has access to the appropriate keys for each folder type configured within its sync folder tree 625. Thus, the client system 610 has access to, depending upon the specific configuration, the one or more shared keys, the one or more managed keys, and the one or more personal keys. In embodiments, only the shared key or keys are known to the datastore manager 665.

In embodiments, the encryption setting for a sub-folder may be set as a default of its parent folder. For example, Folder x 628-*x* is encrypted with a shared key because it is a sub-folder of the root sharing folder 628. Alternatively, or additionally, sub-folder encryption may be set by a user or an administrator. In embodiments, the sync root folder 626 may be set with a default to have a managed key or a personal key encryption level.

It shall be noted that a user may have a sync client 610 on more than one device. In embodiments, all of the devices having a sync client linked to the same account may be configured to sync with each other via the datastore 670. In embodiments, the different sync clients may be configured to allow for different sync configurations so that not all files are synchronized across all devices. In embodiments, a local device may have more than one sync client operating upon it. One skilled in the art shall recognize that a number of different configurations may be employed without departing from the spirit and scope of the present disclosure.

2. Remote Datastore Embodiments

FIG. 6 also depicts the remote datastore 670 portion of the synchronization system 600. As illustrated in FIG. 6, embodiments include a datastore manager 665 that comprises a sync folder minor 655 and a datastore sync manager 660.

In embodiments, the sync folder mirror 655 contains all items stored within the sync folder tree 625 in the client or clients of a user account. The sync folder mirror 655 comprises folders that have different encryption applied to them. For example, as shown in FIG. 6, the sync folder minor includes two shared-key folder 658 and 658-*x*, which were encrypted with a shared key, that minor folders (i.e., 628 and 628-*x*) on the client, and a managed-key folder 657-A, which was encrypted with a managed key, that minors the folder (i.e., folder 629) on the client, and so forth.

In embodiments, the datastore sync manager 665 may also monitor for changes in the sync folder mirror 655 that are newer than changes in the sync folder tree 625. In such cases, the updated items may be sent to the sync client 610 for storage in the sync folder tree 625.

In embodiments, the datastore sync manager 660 comprises a folder encryption map 650 and a controls/audit module 645. In embodiments, the folder encryption map 650 is similar to and functions in like manners as the folder encryption map 630 in the sync client 610. Thus, the folder encryption map 650 identifies the appropriate encryption/decryption for the folders and a pathway to obtain the key for the folders or copy of the key or keys. Thus, when the datastore manager 665 needs to encrypt/decrypt an item, it can reference the mapping to obtain the appropriate key, if it has access to such keys. And, like the folder encryption map 630 in the client 610, the datastore's folder encryption map 650 may include other information related to encryption such as an encryption algorithm identifier (e.g., Advanced Encryption Standard (AES), Triple-DES encryption, etc.), the number of bits of encryption (e.g., 128, 256, etc.), and the like. However, unlike the folder encryption map 630 in the client 610, the datastore's folder encryption map 650 will not include information related to certain keys, such as the managed key(s) or personal key(s), if any.

It shall be noted that there are at least two benefits of restricting access to managed key(s) and personal key(s) for the datastore 665. First, because the datastore system 665 cannot decrypt the data encrypted with such keys, the datastore cannot be subject to third-party requests for access to sensitive encrypted data stored in the sync folder minor 655. For example, if the service provider of the sync service is subpoenaed, they are unable to produce any intelligible data except for those files that are encrypted with the shared key (to which the datastore manager has access) or that are public, unencrypted files (if any)—all other files are encrypted even to the datastore. This allows the user of the sync client to control discovery and other official requests of its sensitive data. Second, because service providers are often targets of hacking, even if a service provider of the sync service is hacked, the hacker cannot gain access to the user's managed key(s) or personal key(s). Unless the hacker is able to break the encryption of the managed key(s) and/or personal key(s), any files so encrypted will be unintelligible to the hackers. Thus, there is added security for the client by limiting access to managed key(s) and personal key(s).

It should be noted that, in embodiments, the datastore manager 665 may allow a user to access an account and sync folder minor files 655 via a web or other interface rather than through a sync client (e.g., client 610). In such instances, a user may have limited access to items in his/her sync folder minor 655 because the files are sent to the datastore in an encrypted state and are stored in the encrypted state. Since the datastore sync manager 660 does not have the same access to the encryption keys as does the local sync clients 610, accessing the files via the datastore and not via the client will therefore limit access to the encrypted files. Accordingly, in embodiments, files saved without encryption or saved with shared key encryption can be accessed by signing into the user's account via a browser interface that does not employ the sync client, but any files encrypted with a managed key or a personal key cannot be decrypted as the datastore does not have access to such decryption keys.

As noted above, the datastore sync manager 660 may also include a controls/audit module 645. In embodiments, the controls/audit module 645 provides additional functionality for users. For example, in embodiments, the synchronization system 600 may also comprise an admin/user controller 615 that interfaces with the controls/audit module 645 to set policies, receive audit information, and/or facilitate other administrative functions. In embodiments, the admin/user controller 615 may operate on a local device, such as local device 675, or a different computing device. In embodiments, the admin/user controller 615, or its functionality, may be part of the sync client 610.

Examples of policies that may be set include policies related to user accounts, per-folder encryption settings, encryptions algorithms to be used, bit-level encoding, user account data (e.g., billing/accounting, service level setting, etc.), access restrictions, client installation configurations, and the like. Additional examples of policies include, by way of illustration and not limitation: policies related to what files may be added to a certain folder; policies related to with whom items may be shared; policies related to client configurations; policies that third parties who have sharing access to a client's files may only view, but not download, the shared files; policies related to the accessibility of metadata of files encrypted with managed or personal keys; policies about how many time a third party or user may access a file via non-client device; policies related to notices; and so forth. For example, an organization may set default policies for sync client installations. When the sync client is installed on a local device, it obtains its per-folder encryption settings from the organization's user account data in the cloud. It may also obtain the file path identifier for the managed encryption key, which may be on a local server of the organization behind a firewall. One skilled in the art shall recognize that a number of policies, preference, and account settings may be set and such fall within the spirit and scope of the present disclosure.

In addition to facilitating the setting of policies, preferences, and account settings, the controls/audit module 645 may also track and log data related to user account files. The types of data that may be monitored and logged is manifold, but examples include (but are not limited to): item identifiers (such as file name, folder names, hash values, etc.); who and when a third party was granted access to a shared folder; a date when an item was added to the mirror folder; dates when an item was edited or updated; a date when an item was deleted; dates when an item was synchronized; dates when an item was accessed (or attempted to be accessed) by a third party; an identifier of a third party that accessed an item; snapshots of items for recover; version of items; and the like. A user or admin may log into the system to obtain such data for review and analysis. In embodiments, the admin/user may set policies related to audit notices. For example, a user or administrator may set policies to be notified for any parameter related to file storage, file access, account access, file synchronization, file sharing, collaboration, and the like.

C. Exemplary Method Embodiments

Having set forth system embodiments of high privacy item synchronization with sharing functionality, presented below are some examples of methods that may employ one or more such system embodiments. These method are examples provided by way of illustration and not limitation. One skilled in the art shall recognize other methods that may be performed. What will be apparent to one of ordinary skill in the art is the number of sharing combinations that embodiments of the present invention can readily and easily facilitate, as well as the increased and varied security/privacy options that are also available. No prior solutions provided such varied and elegantly implemented means for data back-up, data synchronization, data collaboration, and data sharing—while considering issues of data security both in data transmission and data storage.

1. Synchronization to the Remote Datastore

Figure 7:
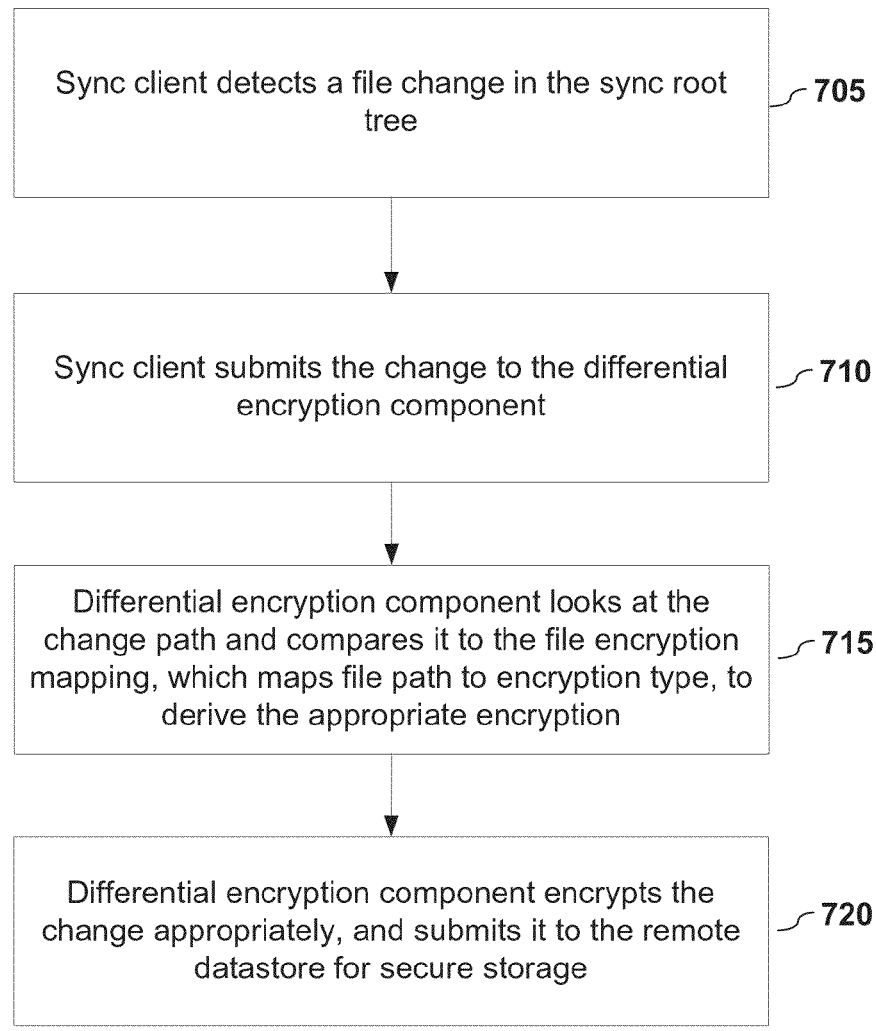
FIG. 7 depicts a method for synchronization from a client to a remote datastore according to embodiments of the present invention.

FIG. 7 depicts a method for item synchronization from a client to a remote datastore according to embodiments of the present invention. In the embodiment depicted in FIG. 7, the synchronization client, such as sync client 610 operating on a local device 675, detects (705) a file change in the sync root tree (e.g., sync tree 625). As previously mentioned, the sync client may detect a change by registering with the local device's operating system so that it is notified when changes are made to any item within the folder tree. One skilled in the art shall recognize that other ways may be employed to monitor changes to the data and that no particular method is critical to the present invention. In embodiments, the sync client submits (710) the change to the differential encryption component (e.g., component 640). The differential encryption component looks at the path of the item that changed and compares (715) the path to the file encryption mapping, such as folder encryption map 630 which maps file path to encryption type, to derive the appropriate encryption. Having ascertained the appropriate encryption, the differential encryption component encrypts the change appropriately, and submits (720) it to the remote datastore (e.g., server/cloud 670) for secure storage.

2. Synchronization from the Remote Datastore

Figure 8:
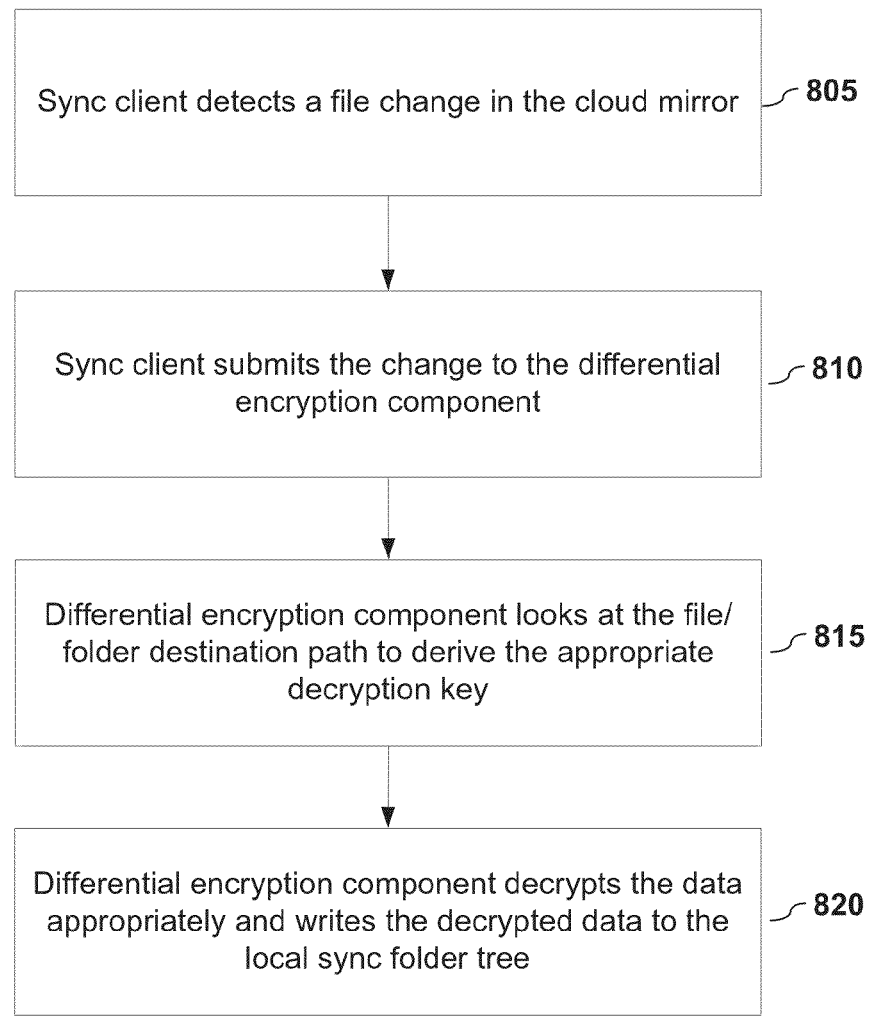
FIG. 8 depicts a method for synchronization from the remote datastore to a client according to embodiments of the present invention.

FIG. 8 depicts a method for item synchronization from the remote datastore to a sync client according to embodiments of the present invention. In the embodiment depicted in FIG. 8, a sync client (e.g., sync client 610) detects (805) a file change in the sync folder minor (e.g., folder 655 in server system 670). In embodiments, the sync client 610 may detect a chance by comparing at regular interval the contents of the sync folder tree 625 and the mirrored tree 655. Alternatively, each tree structure may maintain a change log, in which comparisons of the change log reveals the updates that need to be synchronized. One skilled in the art shall recognize that other ways may be employed to synchronize files and that no particular method is critical to the present invention. In embodiments, the sync client submits (810) the change to the differential encryption component, which looks (815) at the file/folder destination path to derive the appropriate encryption key for decrypting the change file. In embodiments, the differential encryption component may interface with the folder encryption map to identify the appropriate decryption key. The differential encryption component decrypts the data appropriately, and writes (820) the decrypted data to the local sync folder tree. As noted previously, in various embodiments, the data may be differential data or a complete copy of the file or folder that has changed.

3. Collaborative Sharing Between Users with Access to Managed Key

Figure 9:
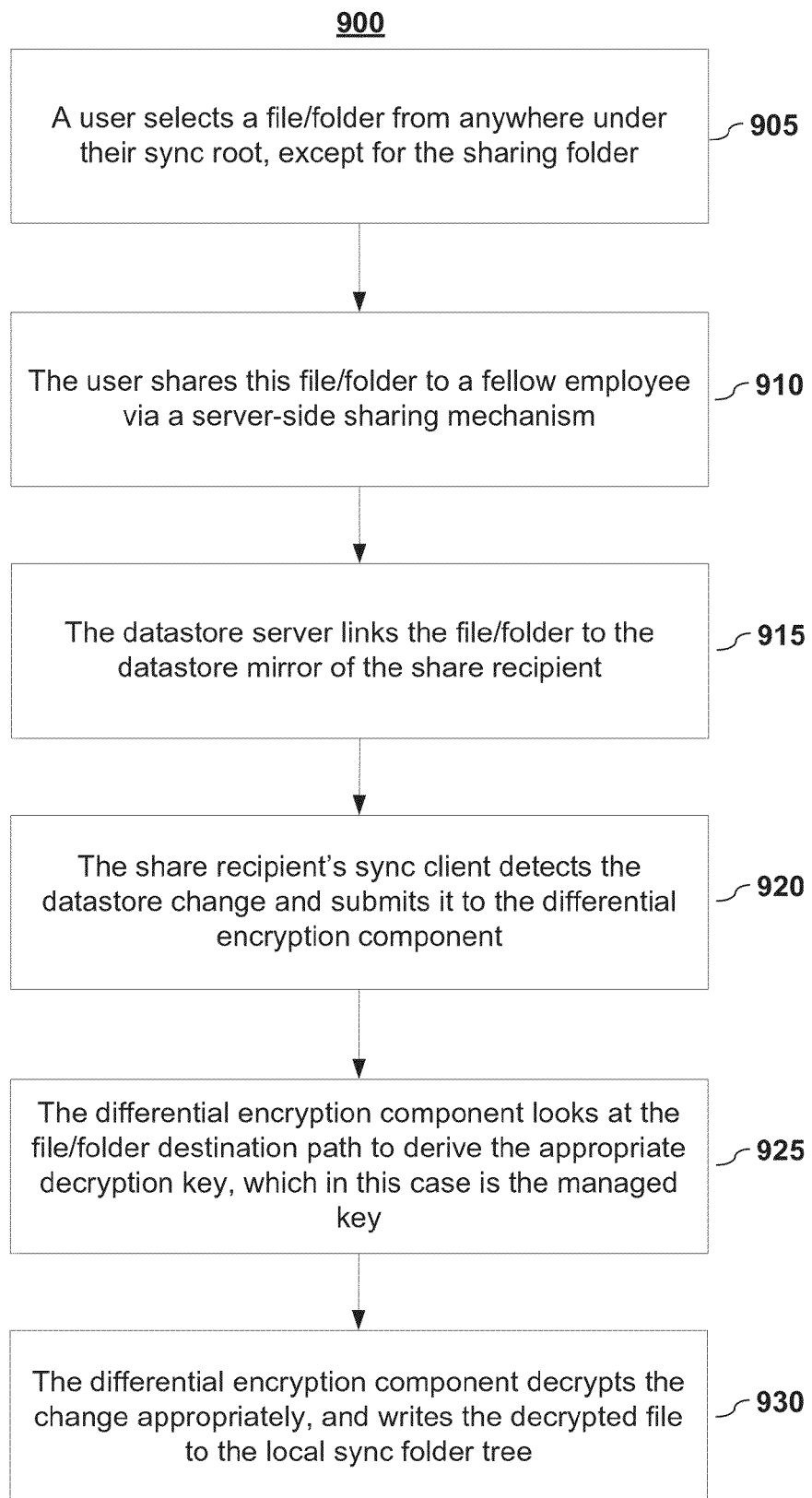
FIG. 9 depicts a method for collaborative sharing between users who have access to the managed key according to embodiments of the present invention.

Turning now to FIG. 9, depicted is a method for collaboration sharing between users who have access to the same managed key according to embodiments of the present invention. In embodiments in which all folders except the sharing folder are intended for encryption with a managed key, which would be common or expected within a business use environment, a user selects (905) a file/folder from anywhere under their sync root, except for the sharing folder, to be shared. In embodiments, the user shares (910) this file/folder to a fellow user (i.e., a fellow employee of the organization, who is the invitee or share recipient). In embodiments, the sharing may be via a server-side sharing mechanism since both users have key access on the server side of the network. For example, in embodiments, the system verifies that the invitee's credentials map to the same organization as the sharer. Having verified the credentials of the second user (i.e., the share recipient) with whom the first user is sharing the managed file or folder, the remote datastore server links (915) the file/folder to the sync folder minor of the share recipient. The share recipient's sync client detects the change in the sync minor and executes a method the same as or similar to that of FIG. 8. That is, in embodiments, the share recipient's sync client detects the change in the sync mirror and submits (920) the shared file or folder data to its differential encryption component. The differential encryption component looks (925) at the file/folder destination path to derive the appropriate decryption key, which in this case is the managed key. In embodiments, the share recipient's system knows which key to use because of the position the shared file or folder has within the tree structure. In alternative embodiments, the system may also securely update the folder encryption map, or a portion thereof. For the second user, the encryption/decryption process is transparent. The differential encryption component obtains access to the decryption key because the share recipient's sync client has access to the managed key and decrypts the change appropriately, and writes (930) the decrypted file to the local sync folder tree. In so doing, the first user and the share recipient can securely and collaboratively work on the file or files and also remotely store them.

4. Collaborative Sharing Between Users without Access to Managed Key

Figure 10:
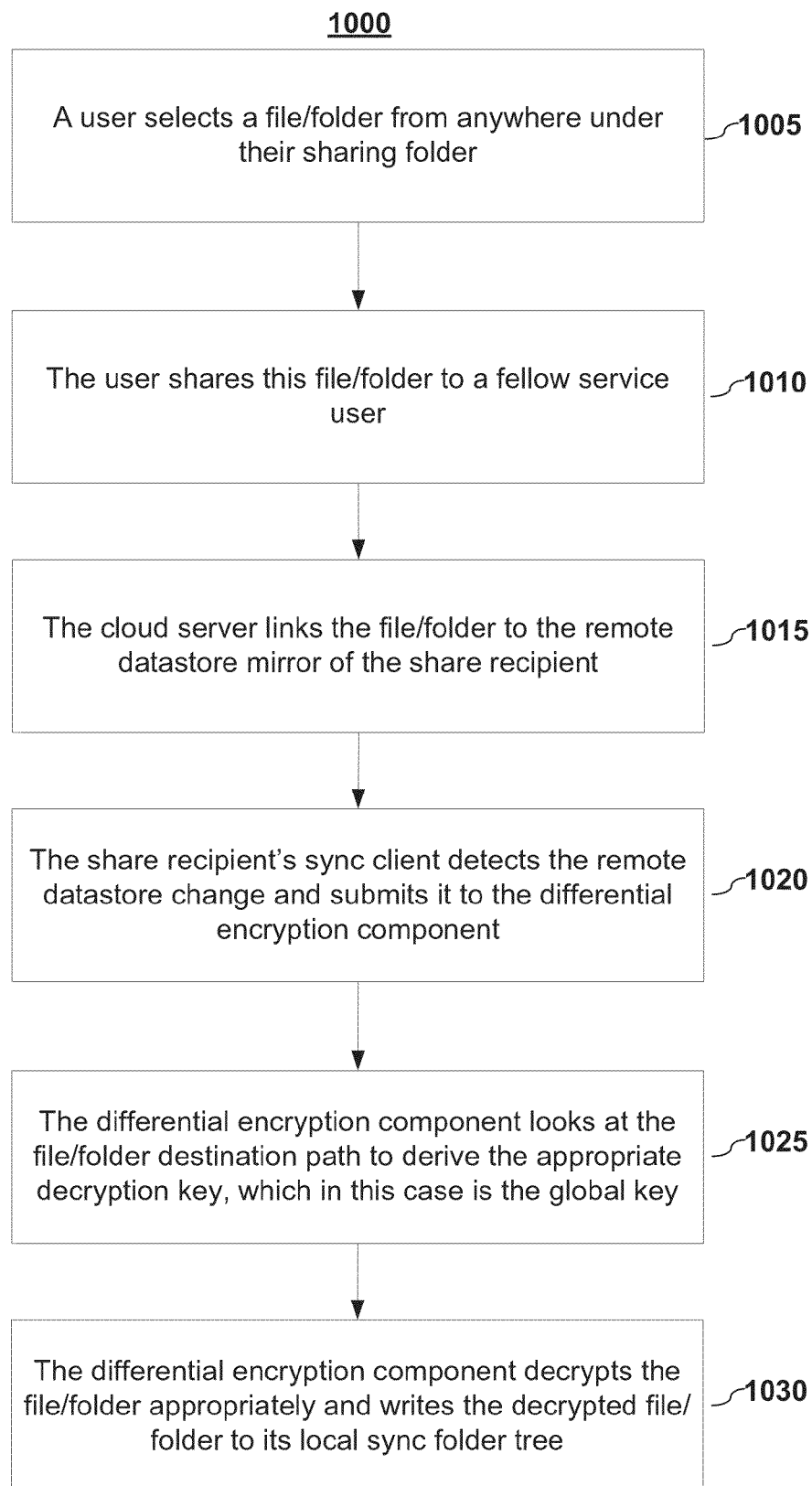
FIG. 10 depicts a method for collaborative sharing between users who do not have access to a common managed key according to embodiments of the present invention.

FIG. 10 depicts a method for collaboration sharing between users who do not have access to a common managed key according to embodiments of the present invention. In embodiments, a user selects (1005) a file/folder from anywhere under the sharing folder root (e.g., folders 628 and 628-*x*). In this embodiment, the sync folder tree is configured such that any item within the sharing root (e.g., folders 628 and 628-*x*) is encrypted using a shared or global key. This shared or global key is accessible by the sync clients of the users of the sync service, thereby allowing any two or more users of the sync service to share files. The first user shares (1010) an item (e.g., one or more files or folders) to a fellow service user (i.e., the share recipient). In embodiments, the share recipient may receive a notice that the first user has requested or invited a sharing, which the share recipient may accept or reject. In alternative embodiments, the sharing may be automatic once the user sharing the data indicates that the sharing recipient can have access to the data. In embodiments, the sharing may be done via a server-side sharing mechanism in that the service verifies that the invitee has valid service credentials before performing the minor link. In establishing the collaborative share, the remote datastore manager links (1015) the item to the sync mirror of the share recipient. The share recipient's sync client detects the change in the sync minor and executes a method the same as or similar to that of FIG. 8. For example, in embodiments, the share recipient's sync client detects the change in the remote datastore sync mirror and submits (1020) it to the differential encryption component of the share recipient. In embodiments, the differential encryption component looks (1025) at the item destination path to derive the appropriate decryption key, which in this case is the global key. In embodiments, the share recipient's system knows which key to use because of the position the shared file or folder has within the tree structure. In alternative embodiments, the system may also securely update the folder encryption map, or a portion thereof. The differential encryption component decrypts the item appropriately and writes (1030) the decrypted item to the local sync folder tree.

5. Simple Sharing Between Entities

Figure 11:
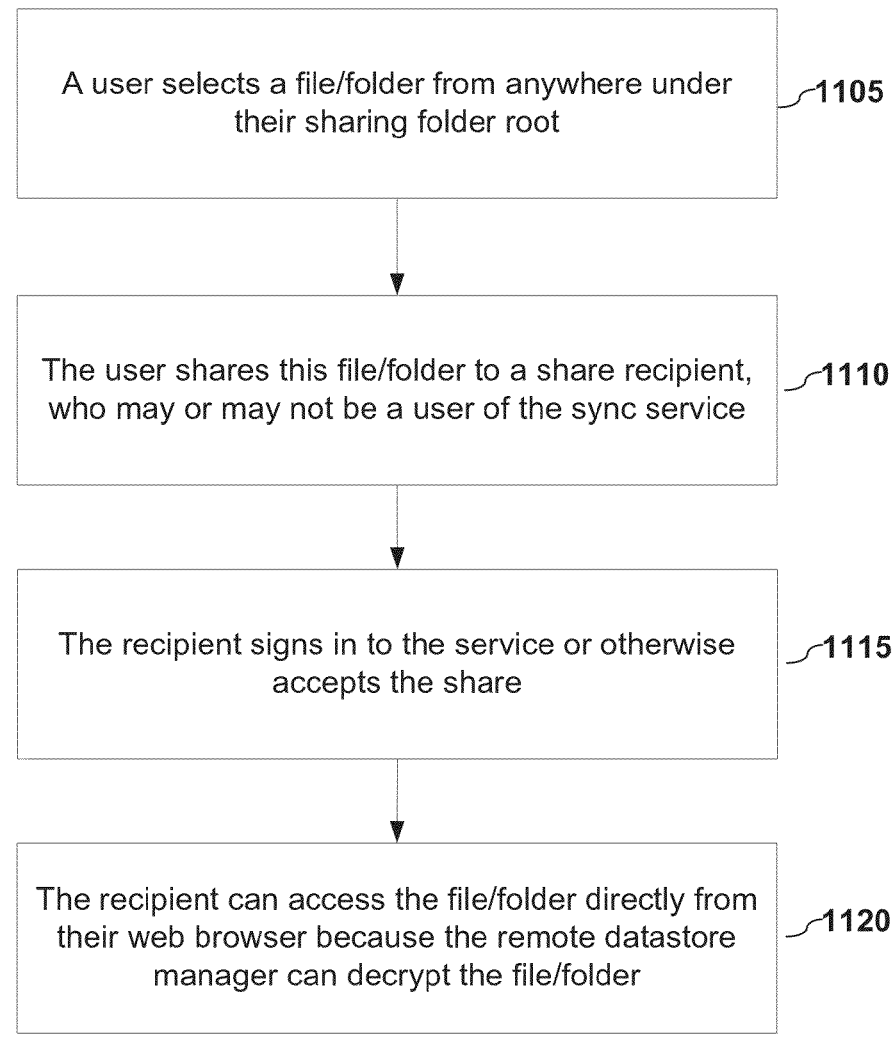
FIG. 11 depicts a method for sharing between entities that do not have access to a common key (neither managed nor shared) according to embodiments of the present invention.

FIG. 11 depicts a method for sharing between entities that do not have access to a common key (neither managed nor shared) according to embodiments of the present invention. In embodiments, a user selects (1105) an item (e.g., one or more files or folders) from anywhere under the sharing folder root. In this embodiment, the sync folder tree is configured such that any item within the sharing root (e.g., folders 628 and 628-*x*) encrypted using a shared or global key. This shared or global key is accessible by sync clients of the sync service and also by the datastore manager/sync service. In embodiments, the user shares (1110) this item with a share recipient, who may or may not be a user of the sync service. In embodiments, the share recipient is notified of the sharing and may accept (1115) it by logging into the service (if already a user), may be asked to register as a user (if not a user), may be given a temporary user account, or may selecting a secure link in the notice. One skilled in the art shall recognize other ways for the share recipient to acknowledge acceptance of the share and gain access to the file, none of which is critical to the present invention. Having assented to the share, the share recipient can view or download (1120) the item directly from their web browser because the remote datastore server can decrypt the item.

It shall be noted that, in embodiment, the item may be simply shared with the share recipient. That is, the share recipient cannot edit or make any changes to the shared item. In embodiments, the share item may actually be stored separately from the sync folder minor of the entity that is sharing for security and data fidelity reasons. Alternatively, the entity that is sharing may indicate that the share recipient can alter the file via the web interface or otherwise, and in embodiments, those changes may be accepted by the entity and synchronized.

D. Computing System Implementations

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 12:
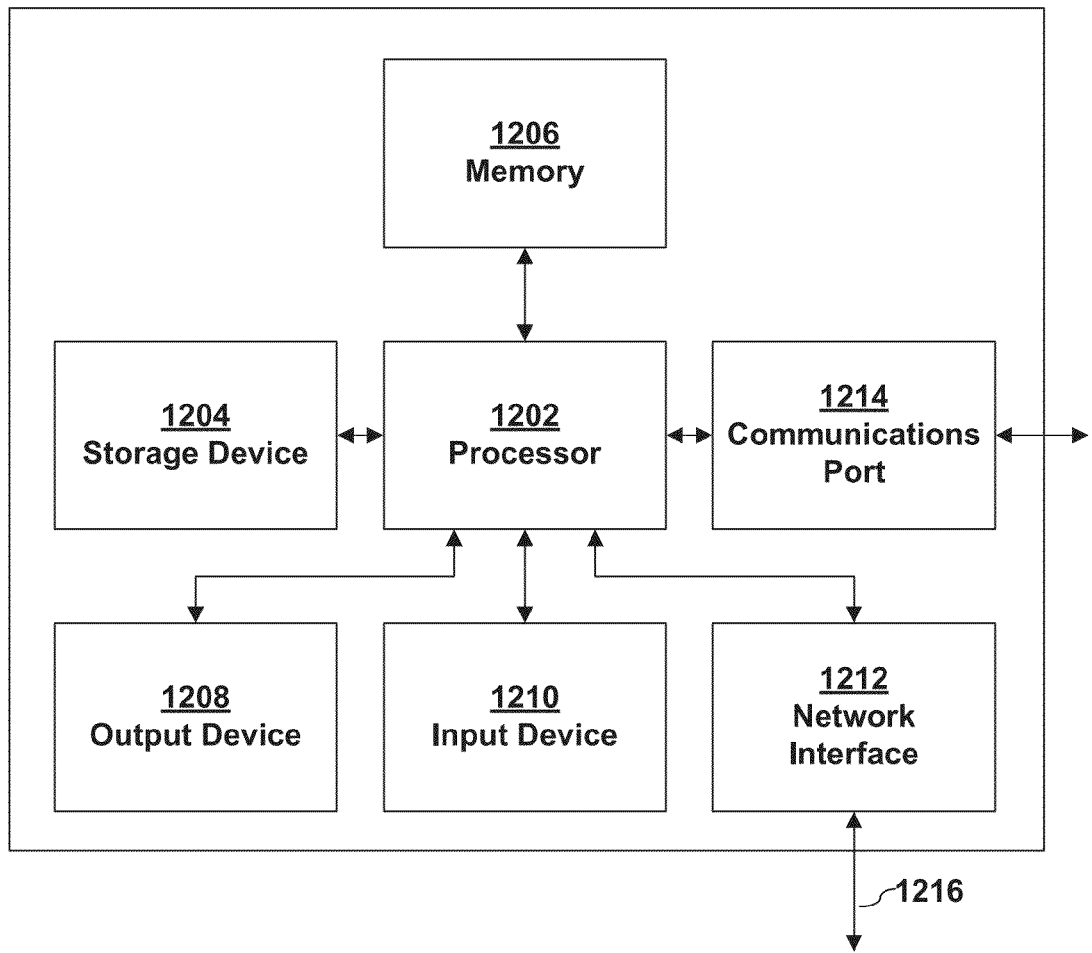
FIG. 12 depicts a block diagram of an example of a computing system according to embodiments of the present invention.

FIG. 12 depicts a functional block diagram of an embodiment of an instruction-execution/computing device 1200 that may implement or embody embodiments of the present invention, including without limitation a client and a server. As illustrated in FIG. 12, a processor 1202 executes software instructions and interacts with other system components. In an embodiment, processor 1202 may be a general purpose processor such as (by way of example and not limitation) an AMD processor, an INTEL processor, a SUN MICROSYSTEMS processor, or a POWERPC compatible-CPU, or the processor may be an application specific processor or processors. The processor or computing device may also include a graphics processor and/or a floating point coprocessor for mathematical computations. In embodiments, a storage device 1204, coupled to processor 1202, provides long-term storage of data and software programs. Storage device 1204 may be a hard disk drive and/or another device capable of storing data, such as a magnetic or optical media (e.g., diskettes, tapes, compact disk, DVD, and the like) drive or a solid-state memory device. Storage device 1204 may hold programs, instructions, and/or data for use with processor 1202. In an embodiment, programs or instructions stored on or loaded from storage device 1204 may be loaded into memory 1206 and executed by processor 1202. In an embodiment, storage device 1204 holds programs or instructions for implementing an operating system on processor 1202. In one embodiment, possible operating systems include, but are not limited to, UNIX, AIX, LINUX, Microsoft Windows, and the Apple MAC OS. In embodiments, the operating system executes on, and controls the operation of, the computing system 1200.

An addressable memory 1206, coupled to processor 1202, may be used to store data and software instructions to be executed by processor 1202. Memory 1206 may be, for example, firmware, read only memory (ROM), flash memory, non-volatile random access memory (NVRAM), random access memory (RAM), or any combination thereof. In one embodiment, memory 1206 stores a number of software objects, otherwise known as services, utilities, components, or modules. One skilled in the art will also recognize that storage 1204 and memory 1206 may be the same items and function in both capacities. In an embodiment, one or more of the methods, functions, or operations discussed herein may be implemented as modules stored in memory 1204, 1206 and executed by processor 1202.

In an embodiment, computing system 1200 provides the ability to communicate with other devices, other networks, or both. Computing system 1200 may include one or more network interfaces or adapters 1212, 1214 to communicatively couple computing system 1200 to other networks and devices. For example, computing system 1200 may include a network interface 1212, a communications port 1214, or both, each of which are communicatively coupled to processor 1202, and which may be used to couple computing system 1200 to other computer systems, networks, and devices.

In an embodiment, computing system 1200 may include one or more output devices 1208, coupled to processor 1202, to facilitate displaying graphics and text. Output devices 1208 may include, but are not limited to, a display, LCD screen, CRT monitor, printer, touch screen, or other device for displaying information. Computing system 1200 may also include a graphics adapter (not shown) to assist in displaying information or images on output device 1208.

One or more input devices 1210, coupled to processor 1202, may be used to facilitate user input. Input device 1210 may include, but are not limited to, a pointing device, such as a mouse, trackball, or touchpad, and may also include a keyboard or keypad to input data or instructions into computing system 1200.

In an embodiment, computing system 1200 may receive input, whether through communications port 1214, network interface 1212, stored data in memory 1204/1206, or through an input device 1210, from (by way of example and not limitation) a scanner, copier, facsimile machine, server, computer, mobile computing device (such as, by way of example and not limitation a phone or tablet), or other computing device.

In embodiments, computing system 1200 may include one or more databases, some of which may store data used and/or generated by programs or applications. In embodiments, one or more databases may be located on one or more storage devices 1204 resident within a computing system 1200. In alternate embodiments, one or more databases may be remote (i.e., not local to the computing system 1200) and share a network 1216 connection with the computing system 1200 via its network interface 1214. In various embodiments, a database may be a database, that is adapted to store, update, and retrieve data in response to commands.

In embodiments, all major system components may connect to a bus, which may represent more than one physical bus. However, various system components may or may not be in physical proximity to one another or connected to the same bus. In addition, programs that implement various aspects of this invention may be accessed from a remote location over one or more networks or may be conveyed through any of a variety of machine-readable medium.

One skilled in the art will recognize no computing system or programming language is critical to the practice of the present invention. One skilled in the art will also recognize that a number of the elements described above may be physically and/or functionally separated into sub-modules or combined together.

It shall be noted that embodiments of the present invention may further relate to computer products with a tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A synchronization system operating on a client system for synchronizing files and providing sharing capabilities, comprising:
   a sync root folder for storing items to be synchronized with a remote datastore, the sync root folder comprising:
      at least one not-shared-key folder for storing items to be encrypted with a not-shared key and to be synchronized with the remote datastore, wherein the not-shared key is not shared with the remote datastore; and
      at least one shared-key folder for storing items to be encrypted with a shared key and to be synchronized with the remote datastore, wherein at least the client system and the remote datastore have access to the shared key;
   a folder encryption map that associates the not-shared key with the at least one not-shared-key folder and associates the shared key with the at least one shared-key folder; and
   a differential encryption component, communicatively coupled to the sync root folder, that, responsive to an item changing within the sync root folder, interfaces with the folder encryption map to access and encrypt the item to be transmitted to and stored at the remote datastore.

2. The synchronization system of claim 1 wherein the not-shared key is a managed key shared within a client organization but not shared with the remote datastore.

3. The synchronization system of claim 1 wherein the not-shared key is a personal key that is not shared with third parties.

4. The synchronization system of claim 1 wherein the folder encryption map further comprising:

storing an encryption algorithm setting for at least one folder of the at least one not-shared-key folder and the at least one shared-key folder.

5. The synchronization system of claim 1 further comprising:
an encryption key store that stores the non-shared key and the shared key and securely provides the differential encryption component with access to the keys.

6. The synchronization system of claim 1 further comprising:
a controls module that facilitates setting one or more policies related to at least the shared-key folder.

7. The synchronization system of claim 6 wherein the controls module sets a policy restricting which files can be put into the shared-key folder.

8. The synchronization system of claim 6 wherein the controls module sets a policy restricting one or more identified items in the shared-key folder in the remote storage to be viewable only to a third party with whom the one or more identified items have been shared.

9. The synchronization system of claim 6 wherein the control module receives audit data related to items in the shared-key folder in the remote datastore.

10. The synchronization system of claim 1 wherein the sync root folder further comprises:
at least one unencrypted folder for storing items that are unencrypted.

11. The synchronization system of claim 10 wherein at least some of the files within the at least one unencrypted folder at the remote datastore are publicly accessible.

12. A datastore managing system operating on one or more service provider computer systems for providing storage and sharing capabilities, comprising:
a storage folder that stores data for a first client, the storage folder associated with the first client and comprises:
a sync root folder for storing items to be synchronized with the first client operating on a client system, the sync root folder comprising:
at least one managed-key folder for storing items encrypted with a managed key, wherein the datastore managing system does not have access to the managed key; and
at least one shared-key folder for storing items encrypted with a shared key, wherein at least the client and the datastore managing system have access to the shared key; and
a folder encryption map that correlates which encryption should be applied to the at least one managed-key folder and to the at least one shared-key folder.

13. The datastore managing system of claim 12 further comprising:
a folder controls manager that allows sharing access to a folder to a second client responsive to receiving instructions from the client to allow the second client sharing access to the folder.

14. The datastore managing system of claim 13 wherein:
responsive to the folder shared with the second client being a managed-key folder, transmitting from datastore managing system to the second client the encrypted managed-key folder, the second client knowing that the managed-key folder is encrypted with the managed key based upon its position within a sync root folder and having access to the managed key to unencrypt the managed-key folder; and
responsive to the folder shared with the entity being a shared-key folder, transmitting from the datastore managing system to the second client the encrypted shared-key folder, the second client knowing that the shared-key folder is encrypted with the shared key based upon its position within a sync root folder and having access to the shared key by being a user of the datastore managing system.

15. The datastore managing system of claim 12 further comprising:
a client installation module that, when executed on a client system causes the client system to generate a client module comprising:
the sync root folder for storing items to be synchronized with the datastore managing system, the sync root folder on the client system comprising:
the at least one managed-key folder for storing items encrypted with a managed key, which managed key is accessible by the client system but not accessible by the datastore managing system; and
the at least one shared-key folder for storing items encrypted with a shared key, which shared key is accessible by at least the client system and the datastore managing system; and
a folder encryption map that associates the managed key with the at least one managed-key folder and associates the shared key with the at least one shared-key folder; and
a differential encryption component, communicatively coupled to the sync root folder, that, responsive to an item changing within the sync root folder, interfaces with the folder encryption map to access and encrypt the item to be transmitted to and stored at the datastore managing system.

16. The datastore managing system of claim 15 wherein the client module further comprises:
a controls module that facilitates setting one or more sharing policies related to one or more folders of the sync root folder.

17. The datastore managing system of claim 16 wherein the control module receives audit data related to items in the shared-key folder in the datastore managing system.

18. A computer-implement method comprising:
generating at least one not-shared-key folder that is associated with a not-shared key that is used to securely handle items stored in the not-shared-key folder, which not-shared key is accessible by at least one client system but not accessible by a datastore system with which the not-share-key folder is remotely stored;
generating at least one shared-key folder that is associated with a shared key that is used to securely handle items stored in the shared-key folder, which shared key is accessible by at least one client system and accessible by the datastore system with which the share-key folder is remotely stored; and
maintaining a folder encryption map that maps which encryption should be applied based upon whether an item is within the at least one not-shared-key folder or within the at least one shared-key folder.

19. The computer-implement method of claim 18 wherein the at least one not-shared-key folder comprises at least one of:
at least one managed-key folder that is associated with a managed key that is used to securely handle items stored in the manage-key folder, which managed key is accessible by at least one client system within a common organization but is not accessible by the datastore system with which the managed-key folder is remotely stored; and at least one personal-key folder that is associated with a personal key that is used to securely handle items stored in the personal-key folder, which personal key is accessible by a client system but not accessible by the datastore system with which the personal-key folder is remotely stored.

20. The computer-implement method of claim 18 further comprising:

responsive to receiving notification of a change to at least one item within a folder system comprising the at least one not-shared-key folder and the at least one shared-key folder, using the folder encryption map and a file path of the at least one item that changed within a folder system to identify the encryption for the least one item.

* * * * *